United States Patent
Avison et al.

(10) Patent No.: US 10,879,513 B2
(45) Date of Patent: Dec. 29, 2020

(54) NANOPOROUS COMPOSITE SEPARATORS WITH INCREASED THERMAL CONDUCTIVITY

(71) Applicant: Optodot Corporation, Woburn, MA (US)

(72) Inventors: David W. Avison, Townsend, MA (US); Shreyans Shingi, Lowell, MA (US); Chandrakant C. Patel, Burlington, MA (US); Charles R. Comeau, Jr., Groton, MA (US); Samuel Lim, Lynn, MA (US)

(73) Assignee: Optodot Corporation, Devens, MA (US)

( * ) Notice: Subject to any disclaimer, the term of this patent is extended or adjusted under 35 U.S.C. 154(b) by 177 days.

(21) Appl. No.: 14/787,426

(22) PCT Filed: Apr. 29, 2014

(86) PCT No.: PCT/US2014/035947
§ 371 (c)(1),
(2) Date: Oct. 27, 2015

(87) PCT Pub. No.: WO2014/179355
PCT Pub. Date: Nov. 6, 2014

(65) Prior Publication Data
US 2016/0104876 A1    Apr. 14, 2016

Related U.S. Application Data

(60) Provisional application No. 61/817,119, filed on Apr. 29, 2013.

(51) Int. Cl.
*H01M 2/16* (2006.01)
*H01M 2/14* (2006.01)
(Continued)

(52) U.S. Cl.
CPC .......... *H01M 2/166* (2013.01); *B29C 41/003* (2013.01); *B29C 41/02* (2013.01); *B29C 71/02* (2013.01);
(Continued)

(58) Field of Classification Search
None
See application file for complete search history.

(56) References Cited

U.S. PATENT DOCUMENTS 3,625,771 A    12/1971    Arrance et al.
3,647,554 A    3/1972    Arrance et al.
(Continued)

FOREIGN PATENT DOCUMENTS

CA    2605874    1/2007
CN    101796668    8/2010
(Continued)

OTHER PUBLICATIONS

JP 5183016 B2 (a raw machine translation) (Abstract) (Apr. 17, 2013).*
(Continued)

*Primary Examiner* — Carmen V Lyles-Irving
(74) *Attorney, Agent, or Firm* — Amster, Rothstein & Ebenstein LLP

(57) ABSTRACT

Nanoporous composite separators are disclosed for use in batteries and capacitors comprising a nanoporous inorganic material and an organic polymer material. The inorganic material may comprise $Al_2O_3$, AlO(OH) or boehmite, AlN, BN, SiN, ZnO, $ZrO_2$, $SiO_2$, or combinations thereof. The nanoporous composite separator may have a porosity of between 35-50%. The average pore size of the nanoporous composite separator may be between 10-90 nm. The separator may be formed by coating a substrate with a dispersion including the inorganic material, organic material, and a
(Continued)

solvent. Once dried, the coating may be removed from the substrate, thus forming the nanoporous composite separator. A nanoporous composite separator may provide increased thermal conductivity and dimensional stability at temperatures above 200° C. compared to polyolefin separators.

44 Claims, 9 Drawing Sheets

(51) Int. Cl.
    *H01M 10/0525* (2010.01)
    *C08J 5/22* (2006.01)
    *C08K 3/00* (2018.01)
    *B29C 41/00* (2006.01)
    *B29C 41/02* (2006.01)
    *B29C 71/02* (2006.01)
    *C09K 5/08* (2006.01)
    *H01M 2/18* (2006.01)
    *B29K 23/00* (2006.01)
    *B29K 105/20* (2006.01)
    *B29K 709/02* (2006.01)
    *B29L 31/34* (2006.01)

(52) U.S. Cl.
    CPC .................... *C08J 5/22* (2013.01); *C08K 3/00* (2013.01); *C09K 5/08* (2013.01); *H01M 2/145* (2013.01); *H01M 2/18* (2013.01); *H01M 10/0525* (2013.01); *B29K 2023/00* (2013.01); *B29K 2105/20* (2013.01); *B29K 2709/02* (2013.01); *B29K 2715/003* (2013.01); *B29L 2031/3468* (2013.01); *Y02T 10/7011* (2013.01)

(56) References Cited

U.S. PATENT DOCUMENTS

| | | |
|---|---|---|
| 5,162,175 A | 11/1992 | Visco et al. |
| 5,194,341 A | 3/1993 | Bagley et al. |
| 5,314,765 A | 5/1994 | Bates |
| 5,326,391 A | 7/1994 | Anderson et al. |
| 5,340,669 A | 8/1994 | Chaloner-Gill et al. |
| 5,350,645 A | 9/1994 | Lake et al. |
| 5,415,954 A | 5/1995 | Gauthier et al. |
| 5,418,091 A | 5/1995 | Gozdz et al. |
| 5,439,760 A | 8/1995 | Howard et al. |
| 5,549,717 A | 8/1996 | Takeuchi et al. |
| 5,569,520 A | 10/1996 | Bates |
| 5,597,659 A | 1/1997 | Morigaki et al. |
| 5,691,005 A | 11/1997 | Morigaki et al. |
| 5,731,104 A | 3/1998 | Ventura et al. |
| 5,778,515 A | 7/1998 | Menon |
| 5,824,434 A | 10/1998 | Kawakami et al. |
| 5,840,087 A | 11/1998 | Gozdz et al. |
| 5,882,721 A | 3/1999 | Delnick |
| 5,894,656 A | 4/1999 | Menon et al. |
| 5,948,464 A | 9/1999 | Delnick |
| 6,148,503 A | 11/2000 | Delnick et al. |
| 6,153,337 A | 11/2000 | Carlson et al. |
| 6,162,563 A | 12/2000 | Miura et al. |
| 6,183,901 B1 | 2/2001 | Ying et al. |
| 6,190,426 B1 | 2/2001 | Thibault |
| 6,194,098 B1 | 2/2001 | Ying et al. |
| 6,224,846 B1 | 5/2001 | Hurlburt et al. |
| 6,268,087 B1 | 7/2001 | Kim et al. |
| 6,277,514 B1 | 8/2001 | Ying et al. |
| 6,287,720 B1 | 9/2001 | Yamashita et al. |
| 6,306,545 B1 | 10/2001 | Carlson et al. |
| 6,328,770 B1 | 12/2001 | Gozdz |
| 6,344,293 B1 | 2/2002 | Geronov |
| 6,410,182 B1 | 6/2002 | Ying et al. |
| 6,423,444 B1 | 7/2002 | Ying et al. |
| 6,432,586 B1 | 8/2002 | Zhang |
| 6,444,344 B1 | 9/2002 | Saito et al. |
| 6,451,484 B1 | 9/2002 | Han et al. |
| 6,488,721 B1 | 12/2002 | Carlson |
| 6,497,780 B1 | 12/2002 | Carlson |
| 6,679,926 B1 | 1/2004 | Kajiura |
| 6,723,467 B2 | 4/2004 | Yoshida et al. |
| 6,811,928 B2 | 11/2004 | Aihara et al. |
| 6,846,435 B1 | 1/2005 | Bohnen et al. |
| 7,014,948 B2 | 3/2006 | Lee et al. |
| 7,029,796 B2 | 4/2006 | Choi et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,160,603 B2 | 1/2007 | Carlson |
| 7,378,185 B2 | 5/2008 | Fujikawa et al. |
| 7,396,612 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,277,981 B2 | 10/2012 | Kim et al. |
| 8,883,347 B2 | 11/2014 | Baba et al. |
| 8,883,354 B2 | 11/2014 | Carlson et al. |
| 8,962,182 B2 | 2/2015 | Carlson |
| 9,065,120 B2 | 6/2015 | Carlson |
| 9,070,954 B2 | 6/2015 | Carlson et al. |
| 9,118,047 B2 | 8/2015 | Carlson |
| 9,180,412 B2 | 11/2015 | Jo et al. |
| 9,209,446 B2 | 12/2015 | Carlson |
| 9,660,297 B2 | 5/2017 | Carlson |
| 9,871,239 B2 | 1/2018 | Carlson et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0106561 A1 | 8/2002 | Lee et al. |
| 2002/0141029 A1 | 10/2002 | Carlson et al. |
| 2003/0003363 A1* | 1/2003 | Daido ............... H01M 2/14 429/231.95 |
| 2003/0035995 A1 | 2/2003 | Ohsaki et al. |
| 2003/0118910 A1 | 6/2003 | Carlson |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0221190 A1 | 10/2005 | Sudano et al. |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |

(56) References Cited

U.S. PATENT DOCUMENTS

| | | | |
|---|---|---|---|
| 2006/0172185 A1 | 8/2006 | Mimura | |
| 2006/0177732 A1 | 8/2006 | Visco et al. | |
| 2006/0222954 A1 | 10/2006 | Skotheim et al. | |
| 2006/0275661 A1 | 12/2006 | Kim et al. | |
| 2007/0009803 A1* | 1/2007 | Kim | H01M 2/145 429/251 |
| 2007/0065714 A1 | 3/2007 | Hambitzer et al. | |
| 2007/0108120 A1 | 5/2007 | Carlson | |
| 2007/0110990 A1 | 5/2007 | Carlson | |
| 2007/0111070 A1 | 5/2007 | Carlson | |
| 2007/0178384 A1 | 8/2007 | Kajita et al. | |
| 2007/0184350 A1 | 8/2007 | Kim et al. | |
| 2007/0189959 A1 | 8/2007 | Carlson et al. | |
| 2007/0190408 A1 | 8/2007 | Inoue et al. | |
| 2007/0190427 A1 | 8/2007 | Carlson et al. | |
| 2007/0204458 A1 | 9/2007 | Fujita et al. | |
| 2007/0243460 A1 | 10/2007 | Carlson et al. | |
| 2007/0269714 A1 | 11/2007 | Watanabe et al. | |
| 2008/0032197 A1 | 2/2008 | Horpel et al. | |
| 2008/0166202 A1 | 7/2008 | Dunlap et al. | |
| 2008/0182174 A1 | 7/2008 | Carlson et al. | |
| 2008/0285208 A1 | 11/2008 | Sung et al. | |
| 2009/0017380 A1 | 1/2009 | Honda et al. | |
| 2009/0067119 A1 | 3/2009 | Katayama et al. | |
| 2009/0087728 A1 | 4/2009 | Less et al. | |
| 2009/0155678 A1* | 6/2009 | Less | H01M 2/1673 429/144 |
| 2009/0197183 A1 | 8/2009 | Kato | |
| 2009/0202912 A1 | 8/2009 | Baba et al. | |
| 2009/0246636 A1 | 10/2009 | Chiang et al. | |
| 2009/0269489 A1 | 10/2009 | Hennige et al. | |
| 2010/0055370 A1* | 3/2010 | Diehl | C09J 133/02 428/40.6 |
| 2010/0003595 A1 | 7/2010 | Baba | |
| 2010/0175245 A1 | 7/2010 | Do et al. | |
| 2010/0261065 A1 | 10/2010 | Babinec et al. | |
| 2011/0052987 A1 | 3/2011 | Katayama et al. | |
| 2011/0097623 A1 | 4/2011 | Marinis, Jr. et al. | |
| 2011/0281171 A1 | 11/2011 | Yong et al. | |
| 2012/0064399 A1 | 3/2012 | Carlson | |
| 2012/0064404 A1 | 3/2012 | Carlson | |
| 2012/0141877 A1 | 6/2012 | Choi et al. | |
| 2012/0189898 A1 | 7/2012 | Wakizaka et al. | |
| 2012/0258348 A1* | 10/2012 | Hayakawa | H01M 2/1653 429/144 |
| 2013/0089770 A1 | 4/2013 | Nishikawa | |
| 2013/0171500 A1 | 7/2013 | Xu et al. | |
| 2013/0260207 A1 | 10/2013 | Uemura | |
| 2014/0170464 A1* | 6/2014 | Iwase | H01M 2/166 429/144 |
| 2015/0162586 A1 | 6/2015 | Fleischmann et al. | |
| 2015/0249249 A1 | 9/2015 | Ortega et al. | |
| 2015/0299551 A1 | 10/2015 | Ota et al. | |
| 2015/0364790 A1 | 12/2015 | Yonehara et al. | |
| 2016/0141621 A1 | 5/2016 | Negishi et al. | |
| 2016/0164145 A1 | 6/2016 | Carlson | |
| 2017/0012264 A1 | 1/2017 | Carlson et al. | |
| 2017/0098857 A1 | 4/2017 | Carlson | |
| 2017/0222206 A1 | 8/2017 | Carlson | |
| 2017/0271638 A1 | 9/2017 | Xu et al. | |
| 2018/0047963 A1 | 2/2018 | Carlson et al. | |

FOREIGN PATENT DOCUMENTS

| | | |
|---|---|---|
| CN | 102437302 | 5/2012 |
| CN | 102640329 | 8/2012 |
| EP | 0143562 A1 | 6/1985 |
| EP | 0523840 B1 | 1/1993 |
| EP | 0600718 B1 | 6/1994 |
| EP | 0814520 A2 | 12/1997 |
| EP | 0836238 B1 | 4/1998 |
| EP | 0848435 B1 | 6/1998 |
| EP | 0875950 A2 | 11/1998 |
| EP | 0892449 A1 | 1/1999 |
| EP | 1156544 | 11/2011 |
| JP | H06140077 | 5/1994 |
| JP | H06275313 | 9/1994 |
| JP | H08255615 | 10/1996 |
| JP | H0927343 | 1/1997 |
| JP | H10214639 | 8/1998 |
| JP | H11233144 A | 8/1999 |
| JP | 2000323129 | 11/2000 |
| JP | 2002042882 | 2/2002 |
| JP | 2002203542 | 7/2002 |
| JP | 2003517418 A | 5/2003 |
| JP | 2003223926 | 8/2003 |
| JP | 2004119367 | 4/2004 |
| JP | 2005235695 | 2/2005 |
| JP | 2007227136 | 9/2007 |
| JP | 2007258160 | 10/2007 |
| JP | 2008041404 | 2/2008 |
| JP | 2008048838 A | 3/2008 |
| JP | 2008123988 | 5/2008 |
| JP | 2009064566 | 3/2009 |
| JP | 2010056036 | 3/2010 |
| JP | 4932263 | 5/2012 |
| JP | 5183016 B2 | 4/2013 |
| JP | 2013535773 | 9/2013 |
| KR | 1020090052556 | 5/2009 |
| WO | 9102385 A1 | 2/1991 |
| WO | 9103080 A1 | 3/1991 |
| WO | 9708763 | 3/1997 |
| WO | 9931751 | 6/1999 |
| WO | 9933125 A1 | 7/1999 |
| WO | 99057770 A1 | 11/1999 |
| WO | 0076011 A | 12/2000 |
| WO | 0103824 | 1/2001 |
| WO | 0139303 | 5/2001 |
| WO | 2001039293 | 5/2001 |
| WO | 2005022674 A1 | 3/2005 |
| WO | 2006123892 | 11/2006 |
| WO | 2007095348 | 8/2007 |
| WO | 2007120763 | 10/2007 |
| WO | 2007135790 | 11/2007 |
| WO | 2008150070 | 12/2008 |
| WO | 2009014388 | 1/2009 |
| WO | 2009026467 A1 | 2/2009 |
| WO | 2009066946 | 5/2009 |
| WO | 2010016881 | 2/2010 |
| WO | 2010138176 | 12/2010 |
| WO | 2010138177 | 12/2010 |
| WO | 2010138178 | 12/2010 |
| WO | 2010138179 | 12/2010 |
| WO | 2012011944 | 1/2012 |
| WO | 2013146126 | 10/2013 |
| WO | 2014119665 | 8/2014 |
| WO | 2015004069 | 1/2015 |
| WO | 2016168715 | 10/2016 |
| WO | 2017008081 | 1/2017 |

OTHER PUBLICATIONS

Yoshinobu et al. (JP, 2008-210541) (a raw machine translation) (Abstract and Detailed Description) (Sep. 11, 2008).*
International Search Report and Written Opinion received in PCT Application No. PCT/US2014/035947, dated Sep. 5, 2014, 15 pages.
International Preliminary Report on Patentability received in PCT Application No. PCT/US2014/035947, dated Nov. 3, 2015, 10 pages.
First Office Action for CN Application No. 201480026808.5, dated Apr. 19, 2017.
Second Office Action for CN Application No. 201480026808.5, dated Mar. 19, 2018.
"Notification of Reasons for Refusal" for JP Application No. 2016-511812, dated Mar. 6, 2018.
Min Kim et al., "Preparation of a Trilayer Separator and its Application to Lithium-ion Batteries", Journal of Power Sources, Elesevier SA, CH, vol. 195, No. 24, Jul. 2, 2010, pp. 8302-8305.
Daigo Takemura, et al., "A Powder Particle Size Effect on Ceramic Powder Based Separator for Lithium Rechargeable Battery", Journal of Power Sources, Elesevier SA, vol. 146, 2005, pp. 779-783.

(56) References Cited

OTHER PUBLICATIONS

R.J.R. Uhlhorn, et al., "Synthesis of Ceramic Membranes", Journal of Materials Science 27 (1992) 527-537.
Third Office Action for Chinese Patent Application No. 201480026808. 5, dated Nov. 19, 2018, which is a CN counterpart to U.S. Appl. No. 14/787,426.
Korean Intellectual Patent Office, "Office Action", dated Mar. 18, 2020 in Korean Patent Application No. 10-2015-7033742, which is a KR counterpart to U.S. Appl. No. 14/787,426, including cited references and English language translation thereof.

* cited by examiner

US 10,879,513 B2

NANOPOROUS COMPOSITE SEPARATORS WITH INCREASED THERMAL CONDUCTIVITY

RELATED APPLICATIONS

This patent application is a U.S. National Phase application under 35 U.S.C. § 371 of International Application No. PCT/US2014/035947, filed Apr. 29, 2014, entitled NANOPOROUS COMPOSITE SEPARATORS WITH INCREASED THERMAL CONDUCTIVITY, which claims the benefit under 35 U.S.C. § 119(e) of U.S. Provisional Application No. 61/817,119, filed Apr. 29, 2013, each of which is incorporated by reference herein.

FIELD OF THE DISCLOSURE

The present disclosure relates generally to the field of porous membranes and to electric current producing cells and separators for use in electric current producing cells. More particularly, this disclosure pertains to a porous separator membrane comprising an inorganic oxide or other inorganic material where the membrane has increased thermal conductivity compared to porous separator membranes consisting of polyolefin materials. Also, the present disclosure pertains to electric current producing cells, such as lithium ion cells and capacitors, comprising such porous separators with increased thermal conductivity.

BACKGROUND OF THE DISCLOSURE

Lithium batteries, including rechargeable or secondary lithium ion batteries, non-rechargeable or primary lithium batteries, and other types such as lithium-sulfur batteries, are typically made by interleaving a plastic separator, a metal substrate with a cathode layer coated on both sides, another plastic separator, and another metal substrate with an anode layer coated on both sides. To maintain the alignment of the strips of these materials and for other quality reasons, this interleaving is usually done on automatic equipment, which is complex and expensive. Also, in order to achieve sufficient mechanical strength and integrity, the separators and the metal substrates are relatively thick, such as 10 μm or more in thickness. For example, a typical thickness of the copper metal substrate for the anode coating layers is 10 μm, a typical thickness of the aluminum metal substrate for the cathode coating layers is 12 μm, and the plastic separators typically have thicknesses ranging from 12-20 μm. These thick separators and metal substrates are not electrochemically active and thus lower the volume of the electroactive material in the electrodes of the lithium batteries. This limits the energy density and power density of the lithium batteries.

SUMMARY OF THE DISCLOSURE

One aspect of the present disclosure pertains to a porous battery separator including ceramic particles and a polymeric binder, wherein the porous separator has a porosity between 35-50% and an average pore size between 10-50 nm. In some cases, the ceramic particles are selected from the group consisting of inorganic oxide particles and inorganic nitride particles. In some cases, the porous separator exhibits less than 1% shrinkage when exposed to a temperature of 200° C. for at least one hour. In some cases, the ceramic particles include at least one of $Al_2O_3$, AlO(OH) or boehmite, AlN, BN, SiN, ZnO, $ZrO_2$, $SiO_2$, and combinations thereof. In some cases, the ceramic particles include between 65-95% boehmite and a remainder of BN. In some cases, the ceramic particles include between 65-95% boehmite and a remainder of AlN. In some cases, the average pore size is between 10-90 nm. In some cases, less than 1% of the pores have a size outside of 10-90 nm. In some cases, the porosity is between 35-50%. In some cases, the polymeric binder includes a polymer selected from polyvinylidene difluoride (PVdF) and copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations thereof. In some cases, the porous separator has a thermal conductivity that increases when temperature is raised from 25° C. to 50° C. and tested using one of ASTM E1461 and ASTM 1530. In some cases, the separator has a pore volume and greater than 90% of the pore volume includes pores having a pore diameter of less than 100 nm.

Another aspect of the present disclosure pertains to an electrochemical cell including an anode, a cathode, an organic electrolyte, comprising a lithium salt, and a porous separator layer including an organic polymer and a ceramic material, wherein the porous separator layer has a porosity between 35-50% and an average pore size between 10-90 nm and exhibits less than 1% shrinkage when exposed to a temperature of 200° C. for at least one hour. In some cases, the inorganic ceramic particles are selected from the group consisting of inorganic oxide particles and inorganic nitride particles. In some cases, the inorganic ceramic particles include $Al_2O_3$, AlO(OH) or boehmite, AlN, BN, SiN, ZnO, $ZrO_2$, $SiO_2$, and combinations thereof; and the organic polymer includes PVdF and copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations thereof. In some cases, the average pore size is between 25-35 nm. In some cases, the porosity is between 40-45%.

Another aspect of the present disclosure pertains to a method of manufacturing a flexible porous composite separator. The method includes formulating a dispersion, wherein the dispersion includes an organic polymeric material, an inorganic ceramic material, and a solvent; applying the dispersion to a substrate to form a coating; drying and curing the coating; and removing the coating from the substrate thereby forming a flexible porous composite separator, wherein the porous separator has a porosity between 35-50% and an average pore size between 10-50 nm and exhibits less than 1% shrinkage when exposed to a temperature of 200° C. for at least one hour. In some cases, the average pore size is between 20-40 nm and the porosity of the porous composite separator is between 40-45%. In some cases, the inorganic ceramic material includes at least one of boehmite, BN, and AlN.

Another aspect of the present disclosure pertains to a method of transferring heat through a battery including raising the temperature of an electrode in a lithium ion battery, and transferring heat from the electrode through a separator to a second electrode, the separator comprising porous ceramic particles and a polymer, wherein the separator has a porosity of 35-50% and an average pore size between 10-50 nm. In some cases, the average pore size is between 20-40 nm. In some cases, the separator has a plurality of pores and each of the pores has a diameter between 10-50 nm. In some cases, the separator has a plurality of pores and none of the pores has a diameter greater than 100 nm. In some cases, the separator has a porosity between 40-45%. In some cases, the separator exhibits less than 1% shrinkage when exposed to a temperature of 200° C. for at least one hour.

Another aspect of the present disclosure pertains to a flexible composite ceramic separator including a polymer; a first inorganic particulate material dispersed uniformly in the polymer; a second inorganic particulate material dispersed uniformly in the polymer, the second inorganic particulate material differing in either particle size or composition from the first inorganic particulate material; and wherein the flexible composite ceramic separator exhibits a thermal conductivity that is greater than the thermal conductivity of a comparative composite ceramic separator of the same composition that differs only in that it only includes a single inorganic particulate material at the same weight loading as the sum of the loadings of the first and second inorganic particulate materials. In some cases, the single inorganic particulate in the comparative composite ceramic separator is the same as one of the inorganic particulate materials of the flexible composite ceramic separator.

BRIEF DESCRIPTION OF THE FIGURES

For the purpose of illustrating the disclosure, particular experimental data are shown in the figures. It should be understood, however, that the disclosure is not limited to the precise data shown.

DETAILED DESCRIPTION OF THE DISCLOSURE

Figure 1:
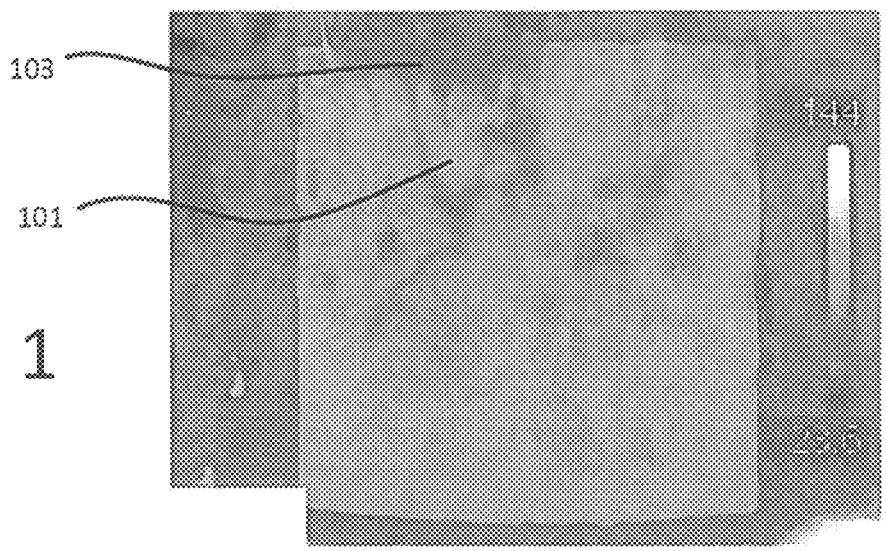
FIGS. 1-2 show thermograms of a polymeric separator and boehmite-based separator prepared according to an embodiment of the present disclosure.

Nanoporous composite separators are disclosed comprising a composite of porous/nanoporous inorganic material and an organic polymer material. Such composite separators may be used, for instance, in batteries and/or capacitors. The inorganic material may comprise $Al_2O_3$, $AlO(OH)$ or boehmite, AlN, BN, SiN, ZnO, $ZrO_2$, $SiO_2$, or combinations thereof. The organic polymer material may include, for example, polyvinylidene difluoride (PVdF) and/or copolymers thereof, polyvinyl ethers, urethanes, acrylics, cellulosics, styrene-butadiene copolymers, natural rubbers, chitosan, nitrile rubbers, silicone elastomers, polyethylene oxide (PEO) or PEO copolymers, polyphosphazenes, or combinations thereof. In one embodiment, the flexible nanoporous composite separator has a porosity between 35-50% or between 40-45% and an average pore size between 10-50 nm. The separator may be formed by coating a substrate with a dispersion including the inorganic material, organic material, and a solvent. Once dried, the coating may be removed from the substrate, thus forming the nanoporous composite separator. A nanoporous composite separator may provide thermal conductivity and dimensional stability at temperatures above 200° C.

General Overview

The porous separator serves a key role in battery designs including prevention of physical contact between the anode and cathode, while facilitating ion transport for electrochemical energy supply as needed. Large format Li-ion batteries may operate in an average temperature range between 20-70° C.; however, spikes in battery charge and/or discharge can push short term temperatures of such batteries beyond 110° C. Separators used for lithium ion batteries are typically polyolefin separators, such as polypropylene or polyethylene that may shrink and/or melt at such high temperatures due to, among other things, chemical breakdown. Although these plastic separators have the low electrical conductivity needed to insulate the electrodes of batteries from each other, plastic separators also have very low thermal conductivity and are therefore slow or inefficient in dissipating heat within a battery. As lithium ion batteries are increasingly utilized for higher capacity applications, such as for electric and/or hybrid vehicles, the need for improved safety is greatly increased because of the large size and high power rates of these batteries. In some cases, the battery separators may be required to maintain dimensional stability (i.e., <5.0% shrinkage of the separator material) at temperatures at or above 200° C. in order to ensure battery performance and safety. Coating of polyolefin separators with ceramic-based materials, and/or selecting higher melting polymer-based materials (PET, polyamides, PVdF, etc.) may increase the thermal stability/battery failure temperature somewhat; however, such techniques increase costs and fail to address a fundamental separator design issue: rapid, efficient, and uniform heat transfer throughout the cell.

Thus, in accordance with an embodiment of the present disclosure, nanoporous inorganic separator materials are disclosed which are electrically isolating, thermally conductive, and maintain dimensional stability at temperatures above 200° C. In one embodiment, a nanoporous separator layer includes an inorganic material (also called ceramic and/or ceramic filler material) and an organic polymer which acts as a binder to hold the inorganic material together. This nanoporous composite separator exhibits a balance of mechanical strength, ionic conductivity, thermal conductivity, and electrical insulation rendering it suitable as a separator membrane for electrochemical cells. Suitable inorganic ceramic materials may include, for example, high thermal-conductivity ceramic particles such as $Al_2O_3$, AlO(OH) or boehmite, AN, BN, SiN, ZnO, $ZrO_2$, $SiO_2$, and combinations of the above. A nanoporous composite separator may be formed, in some embodiments, by dispersing one or more of these inorganic materials with an organic or inorganic polymer material including, but not limited to: PVdF and/or copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, and combinations of the above.

Table 1 provides a number of suitable example inorganic ceramic materials suitable for forming the nanoporous composite separator disclosed herein. The inorganic materials are listed along with their corresponding thermal and electrical properties.

TABLE 1

| inorganic material | thermal conductivity (W/m-K) | volume resistivity ('Ω-cm) |
| --- | --- | --- |
| h-BN | 600/30* | >$10^{14}$ |
| AlN | 285 | >$10^{14}$ |
| Al2O3 | 30 | >$10^{14}$ |
| AlON | 12.3 | — |
| silica | 1.3 | >$10^{10}$ |
| TiO2 | 11.7 | ~$10^{12}$ |
| ZrO2 | 1.7 | >$10^{10}$ |

The thermal conductivity of hexagonal-Boron Nitride (h-BN) may be 600 or 30, in some embodiments, depending on its orientation. In addition to the inorganic materials shown in Table 1, the inorganic material may include boehmite, or a combination of any of these materials. Boehmite is a hydrated form of alumina that may be stable up to temperatures exceeding 600° C. The crystal structure of boehmite is octahedral and is arranged in corrugated layers and is thus less prone to moisture pick-up than other aluminum based materials. In some embodiments, the various properties of the nanoporous composite separator may be tailored by adjusting, for example, particle size, organic polymer, particle size distribution, porosity of the inorganic material, specific surface area, and/or surface treatment of the nanoporous material. In some embodiments, the particle size distribution of the composite separator may be customized by blending boehmite with the various other inorganic materials in various proportions. For example, the nanoporous separator material may be pure boehmite (having less than 1% impurities), may be 90% boehmite and 10% BN or AlN, or it may be 70% boehmite and 30% BN or AlN. Various other proportions and combinations of these inorganic materials will be apparent, in light of this disclosure, and the present disclosure is not intended to be limited to any particular combination or proportion of inorganic materials. In some embodiments, the nanoporous composite separator includes inorganic particles and an organic polymer to bond the inorganic particles together to form a homogeneous separator.

In one specific example embodiment, a nanoporous composite separator was prepared by mixing a 4:1 by weight blend of a boehmite pigment with a PVdF polymer and dispersants in an organic solvent blend comprising N-methylpyrrolidone (NMP) and 2-butanone and coating this mixture onto a silicone release film. In other embodiments, the solvent may comprise other suitable solvents or combinations of solvents such as, for example, benzene, ethyl benzene, toluene, xylene, MEK, NMP, or 2-butanone. Upon oven drying and subsequent delamination from the release substrate, a porous boehmite-based separator of 20 μm in thickness was obtained. The porosity of this separator was about 42%, and the separator showed less than 1% shrinkage when heated in an oven at 220° C. for 1 hour. In another embodiment, the nanoporous composite separator showed less than 0.5% shrinkage under similar heating conditions.

In another example embodiment, the organic polymer material may be a high molecular weight grade of PVdF, such as Solvay® Solef 5130 PVdF. This particular organic material can provide strong adhesion to current collectors, and in one specific example the nanoporous composite separator includes 4.5 parts boehmite to 1 part Solef 5130 by weight. In other embodiments, incorporation of a small amount of co-monomer may enhance the cohesive strength of the separator material. In some embodiments, decreasing the ratio of inorganic oxide to organic polymer will lower the porosity and cycling rate capability of the separator material while increasing its mechanical strength.

In another example embodiment, the nanoporous composite separator may have a porosity between 35-50%, a uniform pore distribution over the entire separator material, and/or an average pore diameter of between 20-40 nm. In different sets of embodiments, the porosity of the separator is between 40-45%. In other sets of embodiments, the inorganic material may include no pores greater than 100 nm, 90 nm, 80 nm, 70 nm, 60 nm, 50 nm, or 40 nm. In still other sets of embodiments, less than 1% or less than 0.1% of the pores are greater than 100 nm, 90 nm, 80 nm, 70 nm, 60 nm, 50 nm, or 40 nm. In other sets of embodiments, the average pore size is between 10-50 nm, 20-40 nm, or 25-35 nm. In still other sets of embodiments, more than 99% or 99.9% of the pores of the composite separator are between 10-90 nm, 10-50 nm, 20-40 nm, or 25-35 nm. The nanoporous composite separator may exhibit similar properties in the machine direction (along the length of the sample) as in the transverse direction (along the width of the sample) if the separator material is not oriented during manufacturing.

In contrast to the cylindrical metal cells commonly used in lithium batteries for portable computers and other applications, many of the lithium batteries for vehicles are of a flat or prismatic design. In some cases, manufacturing high energy and economical lithium batteries for vehicles or other applications may involve increasing the proportion or percentage of the volume of the electroactive material in each battery and reducing the complexity and expense of the automated equipment to fabricate the battery. In some embodiments, a lithium battery may increase the content of electroactive material by implementing thinner separator and/or metal substrate layers. Such lithium batteries may be fabricated, for example, on less complex and less expensive automated processing equipment than, for example, the winding equipment utilized for portable computer batteries. In some embodiments, automated processing equipment may be particularly adapted for making flat or prismatic batteries.

In one embodiment, a dispersion may be prepared including the inorganic material, a polymer material, and a solvent in the desired proportions. The dispersion may then be coated on a temporary carrier substrate and allowed to dry and/or cure in order to obtain the desired mechanical properties prior to removal from the substrate. Once dried and/or cured, the composite material may be removed from the substrate (or the substrate may be removed from the composite material), thus forming a nanoporous composite separator. In various embodiments, the porous separator layer may be a film with a thickness between 5-50 µm, 10-30 µm, 7-20 µm, 10-20 µm, or 15-25 µm.

Nanoporous Composite Separator Examples

Figure 2:
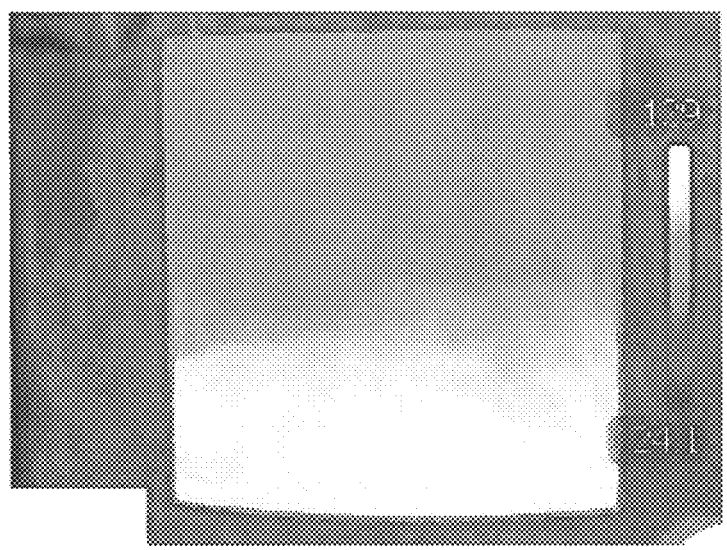

FIGS. 1-2 show thermograms produced using an infrared camera (FLIR Model 8300) of a polymeric separator and boehmite-based separator prepared according to an embodiment of the present disclosure. FIG. 1 is a thermogram of a polyethylene separator film upon exposure to a heated stainless steel substrate, while FIG. 2 is a thermogram of a boehmite-based separator film of similar thickness exposed in like manner to the heated stainless steel substrate. The bright patches 101 in FIG. 1 correspond to areas of increased heat concentration, while the darker patches 103 correspond to areas of decreased heat concentration. The uniform heat distribution observed in the boehmite-based separator of FIG. 2 is evident compared to the uneven heat distribution seen with the plastic separator.

Figure 3:
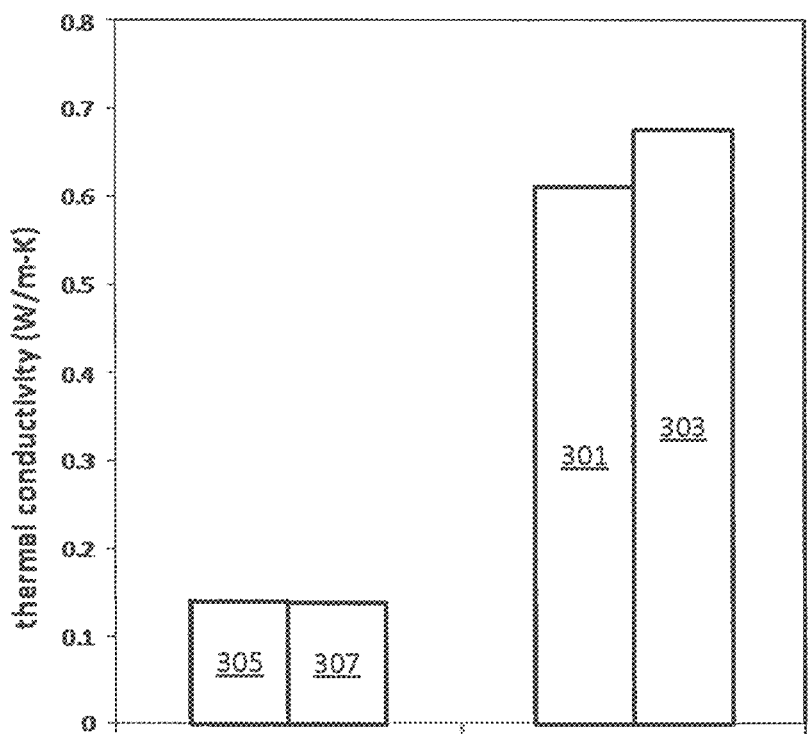
FIG. 3 shows a chart of the thermal conductivity (measured in W/m-K) of a polymeric separator compared to that of a nanoporous composite separator prepared according to an embodiment of the present disclosure.

FIG. 3 shows a chart of the thermal conductivity (measured in W/m-K) of a polymeric separator compared to that of a nanoporous composite separator prepared according to an embodiment of the present disclosure. The measurements in FIG. 3 were done according to ASTM E1461 by the laser flash (transient) method using an LFA-447 from Netszch® Instruments, Burlington, Mass. These measurements illustrate the higher thermal conductivity of the nanoporous composite separator compared to a typical polyolefin separator material. Columns 301 and 303 chart the thermal conductivity of the nanoporous composite separator exposed to temperatures of 25° C. and 50° C., respectively, while columns 305 and 307 chart the thermal conductivity of the polyolefin separator material exposed to 25° C. and 50° C., respectively. In this particular embodiment, the polyolefin separator material used was 18 µm thick polyethylene, and the nanoporous composite separator was 21 µm thick and comprised a 4.5:1 ratio of Boehmite (Disperal® 10SR) to Solvay® Solef 5130. As can be seen in FIG. 3, the thermal conductivity of the nanoporous composite separator is more than four times greater than that of the polyolefin separator of a similar thickness. This enhanced thermal conductivity is further increased, in some embodiments, when the temperature is increased from 25° C. to 50° C. This property of increasing thermal conductivity as the temperature increases is particularly useful for safety in lithium ion batteries since they typically operate at temperatures around 50° C. due to the heat generated during cell operation. It is important to rapidly and evenly distribute the heat throughout the cell to minimize the localized buildup of heat from any "hot spots" or other unevenly heated areas.

Figure 4:
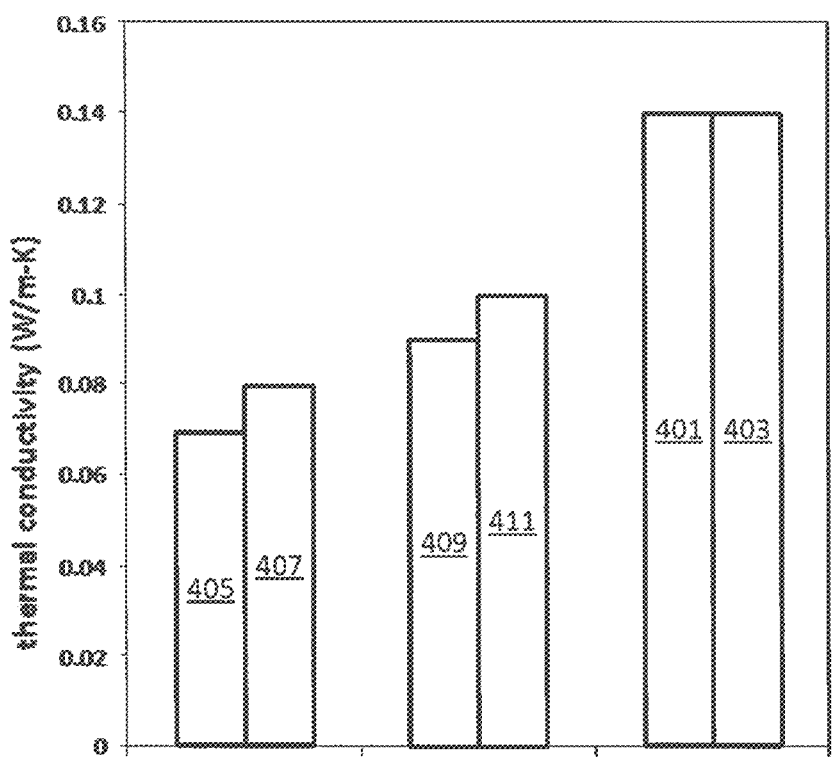
FIG. 4 shows a chart of the thermal conductivity (measured in W/m-K) of a polymeric separator material, a ceramic-coated polymeric separator material, and a nanoporous composite separator material prepared according to an embodiment of the present disclosure.

FIG. 4 shows a chart of the thermal conductivity (measured in W/m-K) of a polymeric separator material, a ceramic-coated polymeric separator material, and a nanoporous composite separator prepared according to an embodiment of the present disclosure. The thermal conductivities charted in FIG. 4 were measured according to the ASTM E1530 guarded hot plate (steady state) method with an estimated variation of +3.0%. These measurements illustrate the higher thermal conductivity of the nanoporous composite separator compared to a typical polymeric separator material and a ceramic-coated polymeric separator material. The samples measured, in this particular example, include the two separator materials measured in FIG. 3, as well as a third sample made from coating each side of the 18 µm thick polyethylene with a 3.5 µm layer comprising a 5.5:1 ratio of boehmite to polymeric binder material. Columns 401 and 403 chart the thermal conductivity of the nanoporous composite separator measured at 25° C. and 50° C., respectively; columns 405 and 407 chart the thermal conductivity of the polyolefin separator material measured at 25° C. and 50° C., respectively; and columns 409 and 411 chart the thermal conductivity of the ceramic-coated polymeric separator material measured at 25° C. and 50° C., respectively. In this particular embodiment, the thermal conductivity of the nanoporous composite separator is about twice that of the polyolefin separator material of a similar thickness, while the ceramic-coated separator material shows a slight improvement of about 20% in thermal conductivity over that of the polyolefin separator material.

Figure 5:
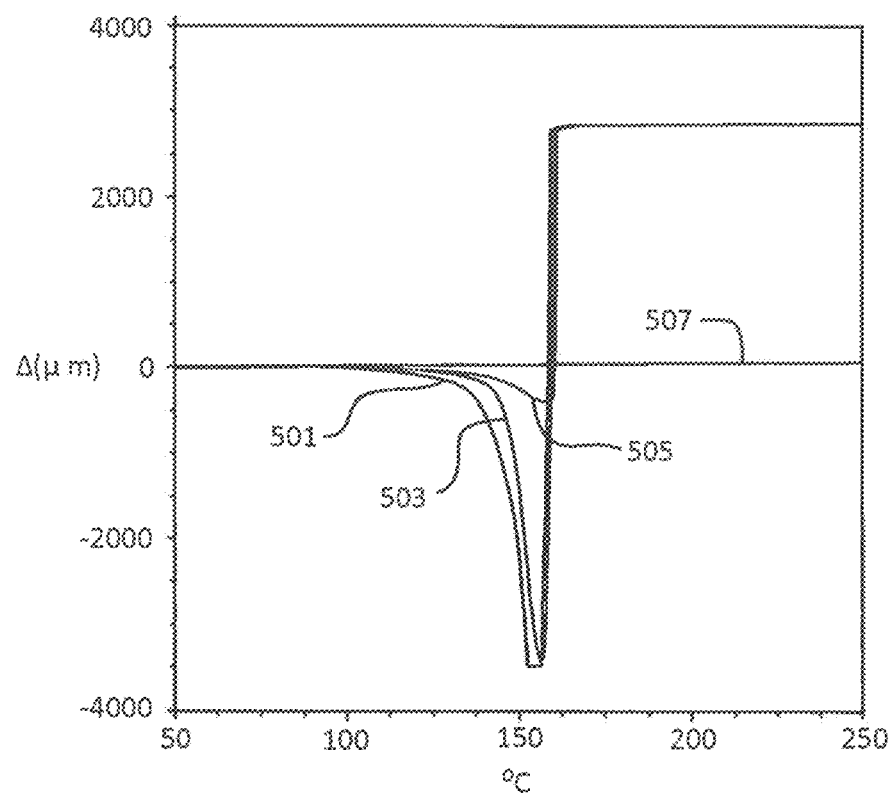
FIGS. 5-6 are graphs of the dimensional stability of various separator materials, including a nanoporous composite separator prepared according to an embodiment of the present disclosure.
Figure 6:
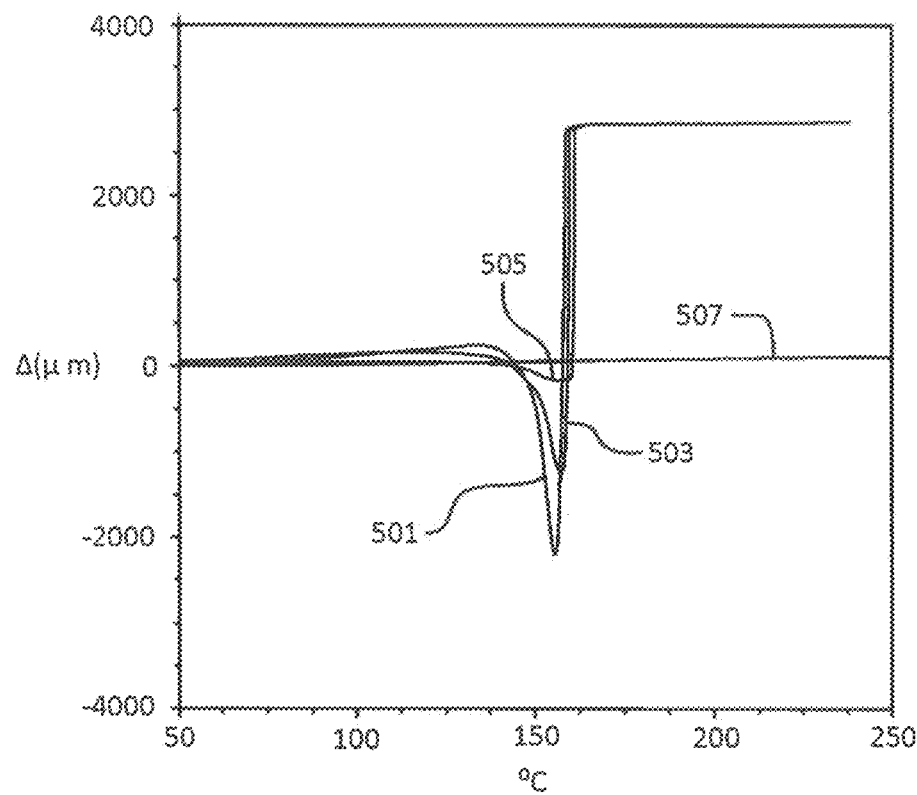

FIGS. 5-6 are graphs of the dimensional stability of various separator materials, including a nanoporous composite separator prepared according to an embodiment of the present disclosure. FIG. 5 graphs the dimensional change (measured in µm) as a function of temperature of the various separator materials measured along the length of the samples, while FIG. 6 graphs the dimensional change measured along the width of the material samples. In the example embodiments shown in FIGS. 5-6, 501 graphs the dimensional change of a polymeric separator material, 503 graphs the dimensional change of a one-side ceramic-coated polymeric separator material, 505 graphs the dimensional change of a two-side ceramic-coated polymeric separator material, and 507 graphs the dimensional change of a nanoporous composite separator prepared according to an embodiment of the present disclosure. In this particular example, the polymeric separator corresponding to graph 501 was a polyethylene polyolefin with a thickness of 18 µm and a Gurley air permeability of 300 sec/100 cc. The separator corresponding to graph 503 was coated on a single side with a 3.5 µm layer comprising a 5.5:1 ratio of Boehmite (Disperal® 10SR) to Arkema Kynar® 761, and the separator had a Gurley air permeability of 470 sec/100 cc. The separator corresponding to graph 505 was coated on two sides with a 3.5 µm layer comprising a 5.5:1 ratio of Boehmite (Disperal® 10SR) to Arkema Kynar® 761, and the separator had a Gurley air permeability of 600 sec/100 cc. The nanoporous composite separator corresponding to graph 507 comprised a 4.5:1 ratio of Boehmite (Disperal® 10SR) to Solvay® Solef 5130, was 21 µm thick, had a Gurley air permeability of 900 sec/100 cc, and a porosity of 40%. As seen in FIGS. 5-6, the dimensional stability of the polymeric separator 501 and the ceramic-coated polymeric separators 503-505 changes greatly between 100-170° C., while the nanoporous composite separator 507 maintains a high dimensional stability well beyond 200° C.

Figure 7:
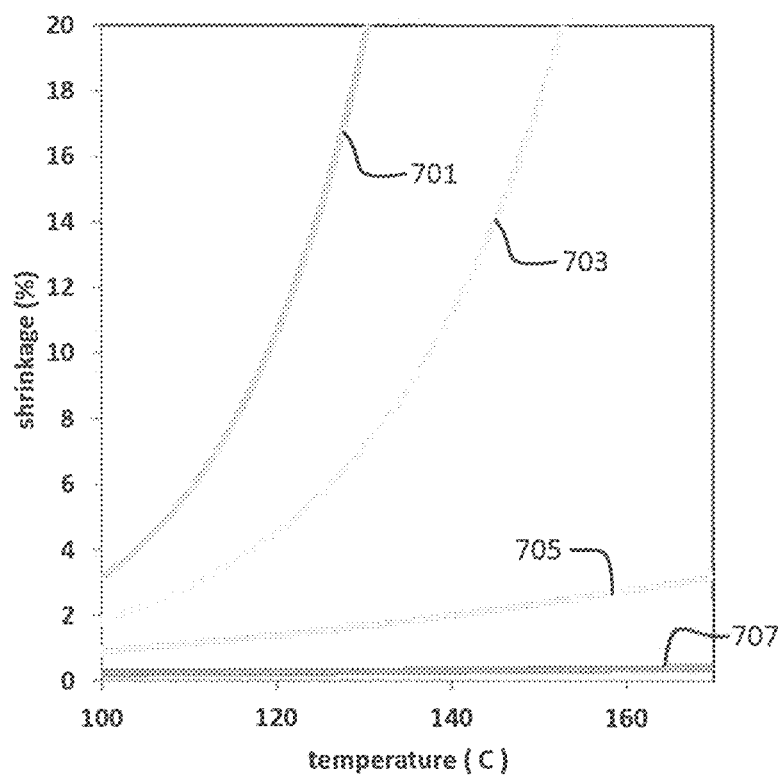
FIGS. 7-8 are graphs of the dimensional stability of various separator materials, including a nanoporous composite separator prepared according to an embodiment of the present disclosure.
Figure 8:
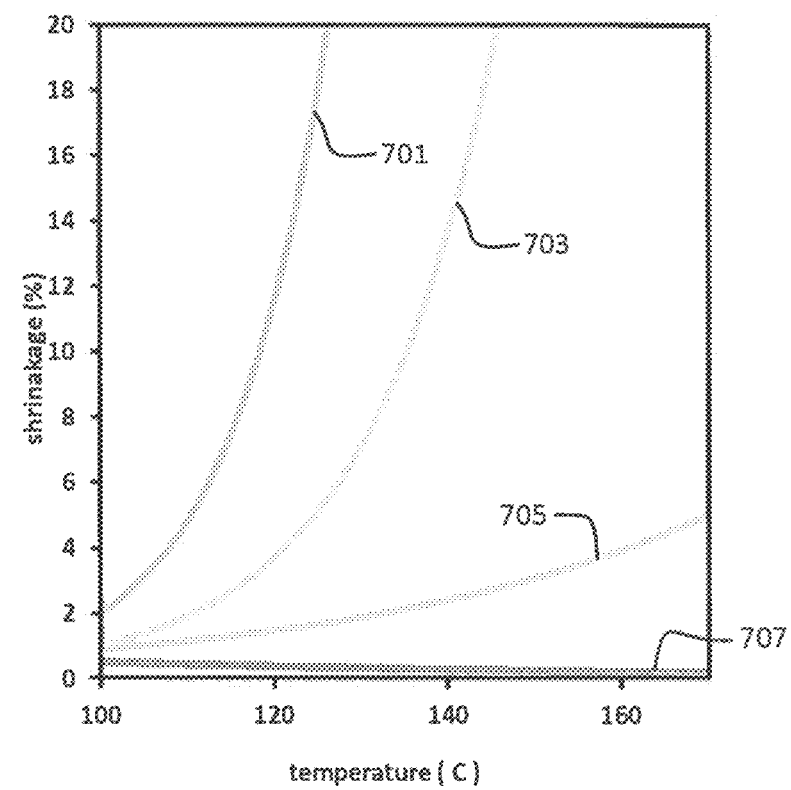

FIGS. 7-8 are graphs of the dimensional stability (measured as percent shrinkage) of various separator materials, including a nanoporous composite separator prepared according to an embodiment of the present disclosure. FIG. 7 graphs the percent shrinkage as a function of temperature of the various separator materials measured along the length of the samples, while FIG. 8 graphs the percent shrinkage measured along the width of the various material samples. The percent shrinkage graphed in FIGS. 7-8 was measured unrestrained over one hour according to the ASTM 1204 standard test method for measuring linear dimensional changes. In the example embodiments shown, 701 graphs the percent shrinkage of a polymeric separator material, 703 graphs the percent shrinkage of a one-side ceramic-coated polymeric separator material, 705 graphs the percent shrinkage of a two-side ceramic-coated polymeric separator material, and 707 graphs the percent shrinkage of a nanoporous composite separator prepared according to an embodiment of the present disclosure. In this particular embodiment, the various separators corresponding to graphs 701, 703, 705, and 707 were the same separators described above in reference to graphs 501, 503, 505, and 507, respectively. As can be seen in FIGS. 7-8, the percent shrinkage of the polymeric separator material 701 and the first ceramic-coated polymeric separator 703 increases dramatically at temperatures above 100° C. The second ceramic-coated polymeric separator material 705 experiences a less dramatic increase in percent shrinkage, while the nanoporous composite separator material 707 maintains a low percent shrinkage at or below 0.5% at temperatures above 160° C.

Figure 9:
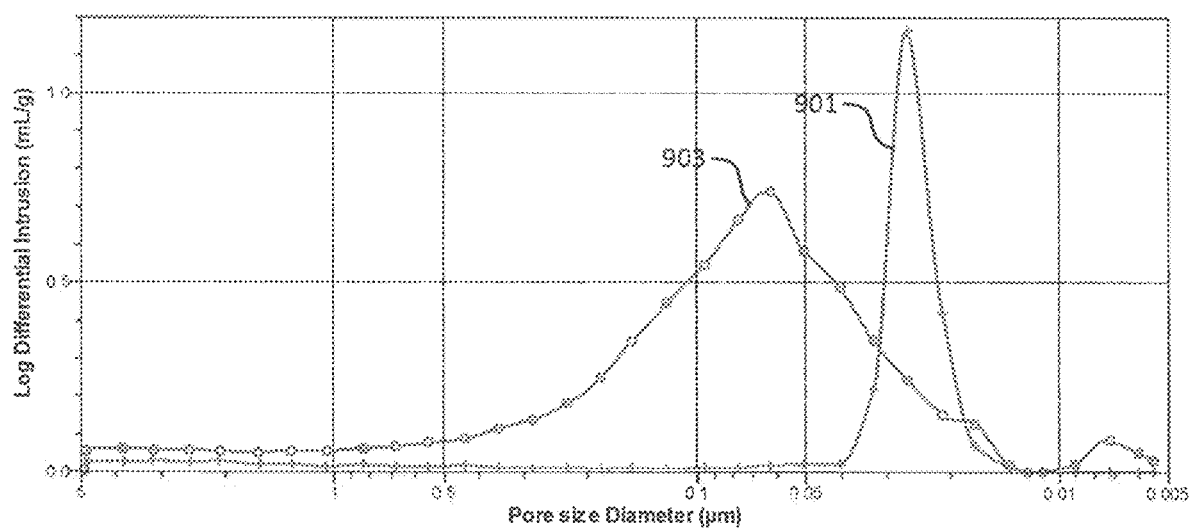
FIG. 9 is a graph of the differential intrusion as a function of pore size diameter of a polymeric separator material and a nanoporous composite separator material prepared according to an embodiment of the present disclosure.

FIG. 9 is a graph of the log of the differential intrusion (measured as mL/g) as a function of pore size diameter (measured in μm) of a polymeric separator material and a nanoporous flexible composite separator prepared according to an embodiment of the present disclosure. In this particular embodiment, 901 graphs the differential intrusion of a nanoporous composite separator 20 μm thick, with a porosity of about 40%, and comprising a 4.5:1 ratio of boehmite (Disperal® 10SR) to Solvay® Solef 5130; and 903 graphs the differential intrusion of a 18 μm thick polyethylene polymeric separator material. As can be seen in this embodiment, the pore size distribution 901 corresponding to the nanoporous composite separator is concentrated at around 30 nm, and has a smaller mean size compared to the distribution 903 corresponding to the polymeric separator. In some embodiments, such a narrow pore size distribution and small average size may minimize the risk of dendritic penetration of the separator, which may cause localized short-circuits. In other embodiments, the pore size distribution of the nanoporous composite separator may be concentrated between 10-90 nm, 10-50 nm, 20-40 nm, or 25-35 nm. The pore size may be tailored, in some embodiments, through the formulation parameters of the nanoporous composite separator. As discussed above, decreasing the ratio of inorganic oxide to organic polymer will lower the porosity and cycling rate capability while increasing the mechanical strength of the material.

Figure 10:
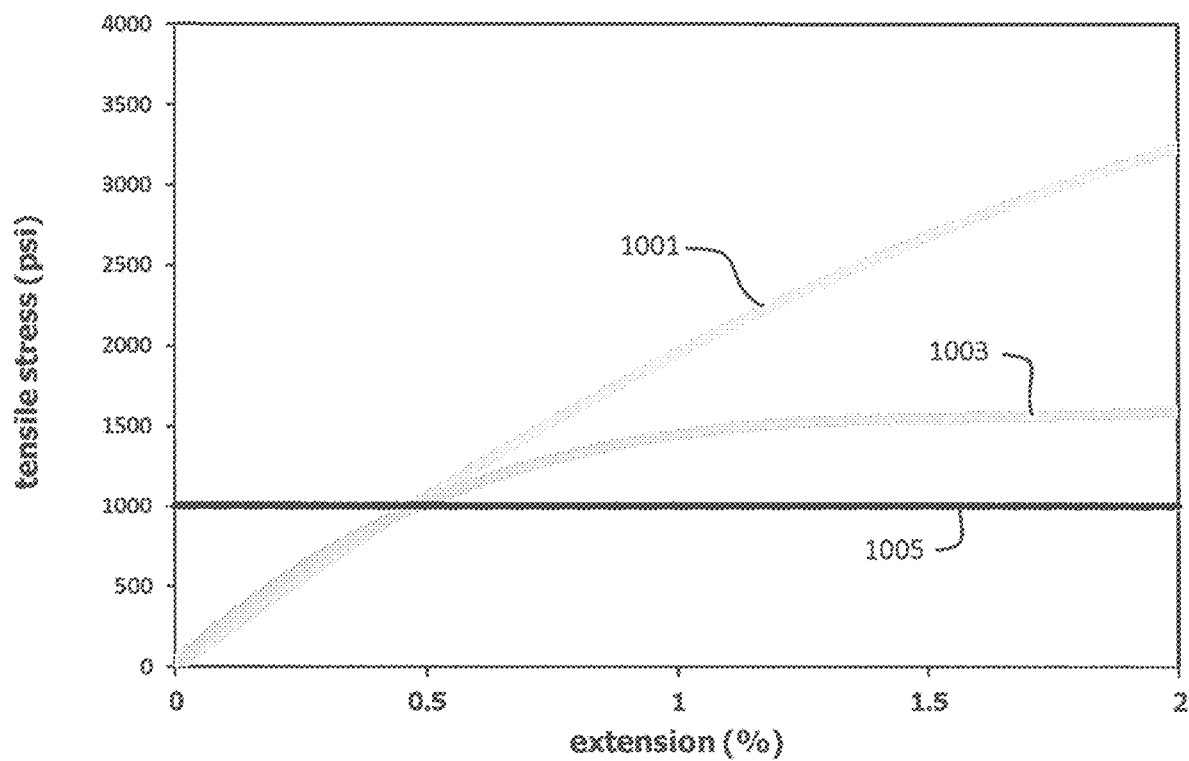
FIG. 10 is a graph of the tensile stress as a function of percent extension of two separator materials, including a nanoporous composite separator material prepared according to an embodiment of the present disclosure.

FIG. 10 is a graph of the tensile stress (measured in psi) as a function of percent extension of two separator materials, including a nanoporous composite separator prepared according to an embodiment of the present disclosure. In this example embodiment, 1001 graphs the tensile stress of a 18 μm thick polyethylene polymeric separator material; while 1003 graphs the tensile stress of a nanoporous composite separator 20 μm thick, with a porosity of about 40%, and comprising a 4.5:1 ratio of boehmite (Disperal® 10SR) to Solvay® Solef 5130. In this particular embodiment, the separators corresponding to graphs 1001, and 1003 were the same separators described above in reference to graphs 501, 503, 505, and 507, respectively. The U.S. Advanced Battery Consortium (USABC) target tensile stress is 1000 psi, and is shown by line 1005. The tensile stresses graphed in FIG. 10 were measured along the length of the material samples using the ASTM D882-00 standard method for measuring the tensile properties of thin plastic sheeting. In another embodiment, the nanoporous composite separator 1003 has more than twice the compression strength of the polymeric separator material 1001.

Figure 11:
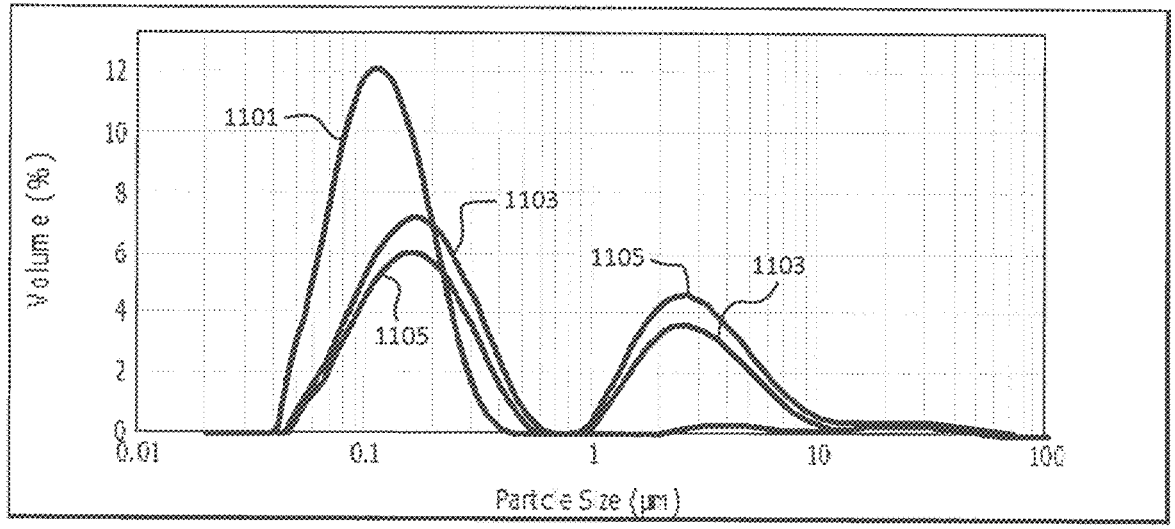
FIG. 11 is a graph of the particle size distribution of various boehmite and boron nitride (BN) blends, according to various embodiments of the present disclosure.

FIG. 11 is a graph of the particle size distribution (volume percent as a function of particle size in μm) of various boehmite and boron nitride (BN) blends, according to various embodiments of the present disclosure. In one specific example embodiment, the BN used is Saint-Gobain® Carbotherm PCTP05. As can be seen in this example, 1101 plots the particle size distribution of a 100% boehmite material, 1103 plots the particle size distribution of a composition including 90% boehmite and 10% BN, and 1105 plots the particle size distribution of a composition including 70% boehmite and 30% BN, according to three embodiments of the present disclosure. The mode of the boehmite material distribution 1101 is at about 0.1 μm. In this particular example the boehmite material distribution 1101 includes a single mode, while the 90% boehmite composition 1103 and the 70% boehmite composition 1105 each display a bimodal distribution with modes at about 0.15-0.19 μm, and at about 2-3 μm.

Figure 12:
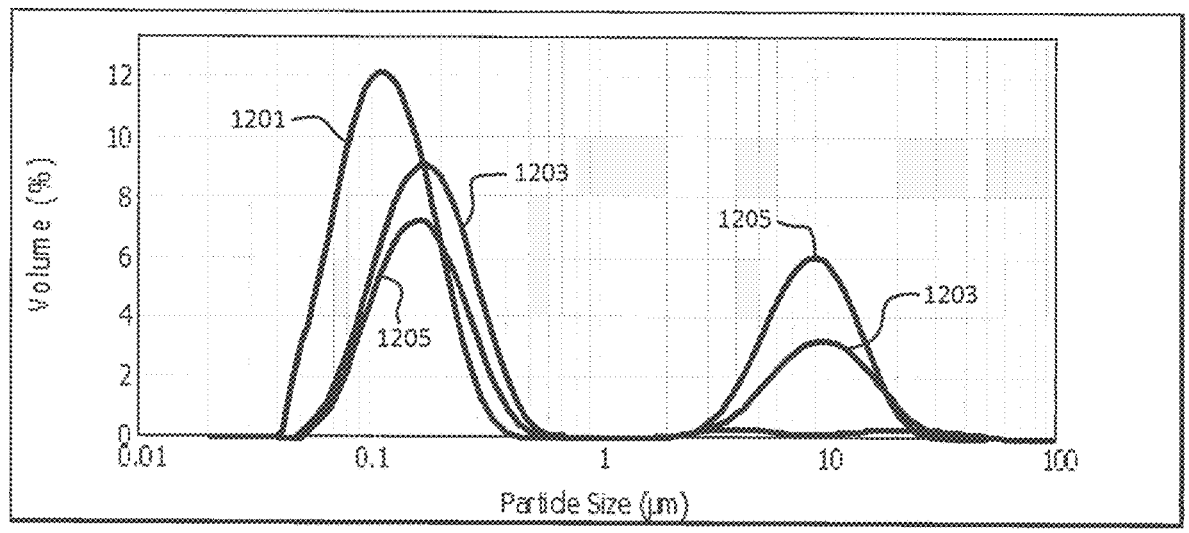
FIG. 12 is a graph of the particle size distribution of various boehmite and alumina nitride (AlN) blends, according to various embodiments of the present disclosure.

FIG. 12 is a graph of the particle size distribution (volume percent as a function of particle size in μm) of various boehmite and alumina nitride (AlN) blends, according to various embodiments of the present disclosure. As can be seen in this example, 1201 plots the particle size distribution of a separator material comprising 100% boehmite, 1203 plots the particle size distribution of a separator material comprising 90% boehmite and 10% AlN, and 1205 plots the particle size distribution of a separator material comprising 70% boehmite and 30% AlN, according to three embodiments of the present disclosure. In one embodiment, the mode of the boehmite material 1201 distribution is at about 0.1 μm, similar to the mode of the boehmite material distribution 1101 graphed in FIG. 11. In this particular example the boehmite material distribution 1201 includes a single mode, while the 90% boehmite material 1203 and the 70% boehmite material 1205 each display a bimodal distribution. The modes of the 90% boehmite material distribution 1203 are at about 0.15-0.19 μm, and at about 8-11 μm, while the modes of the 70% boehmite material distribution 1205 are at about 0.12-0.18 μm and about 7-10 μm.

In some embodiments, the inorganic particles may be of different sizes that are grouped around two, three or more modes. It is believed that by using a multi-modal distribution of particles of different sizes, the particles may be packed in a configuration in the separator that provides for increased heat transfer and better compression strength while maintaining or even improving porosity of the separator. The particles grouped around different modes may be of the same or different composition. For example, boehmite particles having a modal distribution centered at about 100 nm may be combined with additional boehmite particles having a modal distribution centered at about 2 μm. In other embodiments, boehmite particles having a modal distribution centered at about 100 nm may be combined with AlN or BN particles having a modal distribution centered at about 2 μm. The ratio of the particle size at a first mode to the particle size at a second mode can be, for example, greater than 1:2, 1:3, 1:5 or 1:10. In other embodiments, the ratio of the particle sizes of the two modes can be, for example, less than 1:100, 1:50, 1:20, 1:10, 1:5 or 1:3. The ratio (wt/wt) of the amounts of the two different sized particles used in a separator can be greater than 1:1, 2:1, 5:1 or 10:1.

Figure 13:
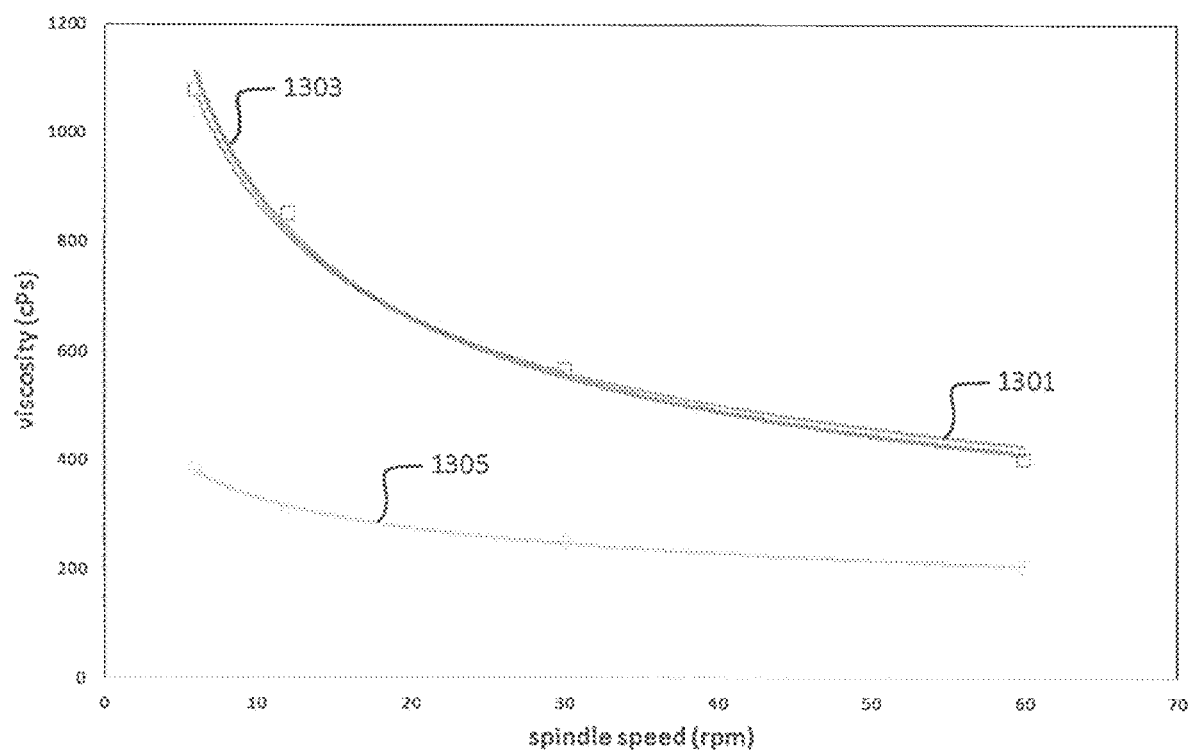
FIG. 13 is a graph of the viscosity profiles for various boehmite and BN blends, in liquid form, according to various embodiments of the present disclosure.

FIG. 13 is a graph of the viscosity profiles (measured as viscosity in cPs as a function of spindle speed in rpms) for the various boehmite and BN blends, in liquid form, according to various embodiments of the present disclosure. As can be seen in this example, 1301 plots the viscosity profile of a 100% boehmite material, 1303 plots the viscosity profile of a composition including 90% boehmite and 10% BN, and 1305 plots the viscosity profile of a composition including 70% boehmite and 30% BN, according to three embodiments of the present disclosure.

In some embodiments, the BN-modified compositions 1103-1105 and 1303-1305 may have higher thermal conductivities than a pure boehmite composition due to a dense packing of the blended filler that is enabled by the bimodal particle size distribution. Likewise, in other embodiments the AlN-modified compositions 1203-1205 may have higher thermal conductivities than a pure boehmite composition due to the bimodal particle size distribution of the AlN-modified composition.

Figure 14:
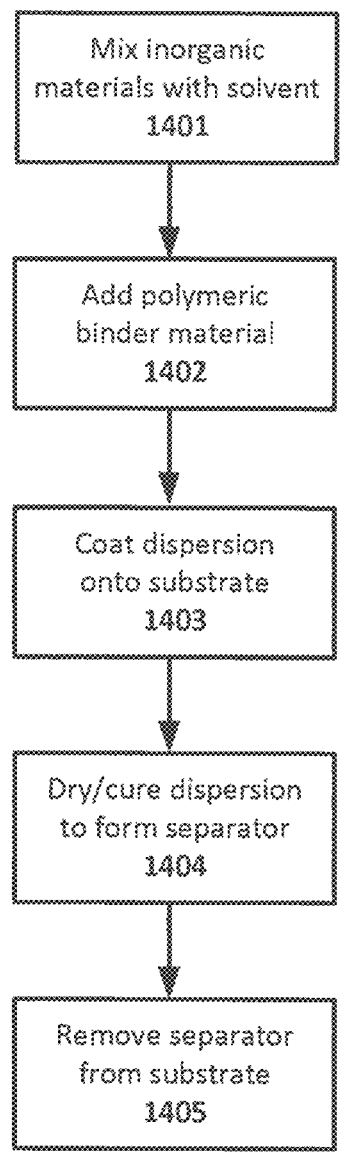
FIG. 14 is a flow chart illustrating a method for preparing a nanoporous composite separator, according to an embodiment of the present invention

FIG. 14 is a flow chart illustrating a method for preparing a nanoporous composite separator, according to an embodiment of the present invention. The method may begin by mixing 1401 inorganic particles with a solvent. In some embodiments, the inorganic particles may include $Al_2O_3$, AlO(OH) or boehmite, AlN, BN, SiN, ZnO, $ZrO_2$, $SiO_2$, or combinations thereof, and the solvent may include toluene, xylene, MEK, NMP, 2-butanone, or any other suitable solvent or combinations thereof. The method may continue with adding 1402 the polymeric binder material in order to form a dispersion. In some embodiments, the polymeric binder material may include polyvinylidene difluoride (PVdF) and copolymers thereof, polyvinyl ethers, urethanes, acrylics, cellulosics, styrene-butadiene copolymers, natural rubbers, chitosan, nitrile rubbers, silicone elastomers, PEO or PEO copolymers, polyphosphazenes, or combinations thereof. The method may continue with coating 1403 the dispersion onto a substrate and drying/curing 1404 the dispersion, thus forming the nanoporous composite separator. Once dried, the method may continue with removing 1405 the nanoporous composite separator from the substrate.

While the disclosure has been described in detail and with reference to specific and general embodiments thereof, it will be apparent to one skilled in the art that various changes and modifications can be made therein without departing from the spirit and scope thereof.

What is claimed is:

1. A flexible porous composite battery separator, comprising:
    a first group and a second group of inorganic particles, wherein
        the first group of inorganic particles comprises boehmite particles having a first particle size and
        the second group of inorganic particles is selected from the group consisting of silica, zirconium oxide, and boehmite particles having a second particle size that is different from the first particle size; and
    a polymeric binder, wherein
    the first group of inorganic particles and the second group of inorganic particles are dispersed in the polymeric binder to form the flexible porous composite battery separator,
    the flexible porous composite battery separator does not comprise an additional polymeric separator layer, and
    the flexible porous composite battery separator has a thermal conductivity of at least 0.6 W/m-K at 25° C. when measured by an ASTM E1461 method.

2. The flexible porous composite battery separator of claim 1, wherein said flexible porous composite battery separator exhibits less than 1% shrinkage when exposed to a temperature of 200° C. for one hour.

3. The flexible porous composite battery separator of claim 2, wherein said flexible porous composite battery separator exhibits less than 1% shrinkage when exposed to a temperature of 220° C. for one hour.

4. The flexible porous composite battery separator of claim 1, wherein the thermal conductivity of said flexible porous composite battery separator is higher at 50° C. than at 25° C.

5. The flexible porous composite battery separator of claim 1, wherein a ratio (weight/weight) of the boehmite particles having the first particle size to the boehmite particles having the second particle size is selected from the group consisting of 1:1, 2:1, 5:1 and 10:1.

6. The flexible porous composite battery separator of claim 1, wherein a ratio (weight/weight) of the first group and the second group of inorganic particles to the polymeric binder is about 4.5:1.

7. The flexible porous composite battery separator of claim 1, wherein the boehmite particles having the first particle size are grouped around a first mode and the boehmite particles having the second particle size are grouped around a second mode that differs from the first mode.

8. The flexible porous composite battery separator of claim 7, wherein the first mode is between 100-200 nm.

9. The flexible porous composite battery separator of claim 1, wherein the first group and the second group of inorganic particles comprise at least 90% boehmite by weight.

10. The flexible porous composite battery separator of claim 1, wherein an average pore size is between 10-50 nm.

11. The flexible porous composite battery separator of claim 1, wherein a porosity is between 35-50%.

12. The flexible porous composite battery separator of claim 1, wherein the polymeric binder comprises polyvinylidene difluoride (PVdF) and/or copolymers thereof.

13. The flexible porous composite battery separator of claim 12, wherein the polymeric binder comprises high molecular weight grade PVdF and/or copolymers thereof.

14. The flexible porous composite battery separator of claim 1, wherein the polymeric binder comprises a polymer selected from the group consisting of polyvinyl ethers, urethanes, acrylics, cellulosics, styrene-butadiene copolymers, natural rubbers, chitosan, nitrile rubbers, silicone elastomers, PEO or PEO copolymers, and polyphosphazenes.

15. The flexible porous composite battery separator of claim 1, wherein the polymeric binder further comprises a co-monomer.

16. The flexible porous composite battery separator of claim 1, wherein a dimensional stability of the flexible porous composite battery separator is substantially constant at temperatures from 50° C. to 250° C.

17. The flexible porous composite battery separator of claim 9, wherein the first group and the second group of inorganic particles comprise at least 95% boehmite by weight.

18. An electrochemical cell comprising:
    an anode;
    a cathode:
    an organic electrolyte comprising a lithium salt; and
    a flexible porous composite battery separator, comprising:
        a first group and a second group of inorganic particles, wherein
            the first group of inorganic particles comprises boehmite particles having a first particle size and
            the second group of inorganic particles is selected from the group consisting of silica, zirconium oxide, and boehmite particles having a second particle size that is different from the first particle size; and a polymeric binder;

wherein the flexible porous composite battery separator has a thermal conductivity of at least 0.6 W/m-K at 25° C. when measured by an ASTM E1461 method, wherein the first group of inorganic particles and the second group of inorganic particles are dispersed in the polymeric binder to form the flexible porous composite battery separator, and wherein the flexible porous composite battery separator does not comprise an additional polymeric separator layer.

19. The electrochemical cell of claim 18, wherein the flexible porous composite battery separator exhibits less than 1% shrinkage when exposed to a temperature of 200° C. for one hour.

20. The electrochemical cell of claim 19, wherein the flexible porous composite battery separator exhibits less than 1% shrinkage when exposed to a temperature of 220° C. for one hour.

21. The electrochemical cell of claim 18, wherein the thermal conductivity of said flexible porous composite battery separator is higher at 50° C. than at 25° C.

22. The electrochemical cell of claim 18, wherein a ratio (weight/weight) of the boehmite particles having the first particle size to the boehmite particles having the second particle size is selected from the group consisting of 1:1, 2:1, 5:1 and 10:1.

23. The electrochemical cell of claim 18, wherein a ratio (weight/weight) of the first group and the second group of inorganic particles to the polymeric binder is about 4.5:1.

24. The electrochemical cell of claim 18, wherein the first group and the second group of inorganic particles comprise at least 90% boehmite by weight.

25. The electrochemical cell of claim 18, wherein the polymeric binder comprises polyvinylidene difluoride (PVdF) and/or copolymers thereof.

26. The electrochemical cell of claim 24, wherein the first group and the second group of inorganic particles comprise at least 95% boehmite by weight.

27. The electrochemical cell of claim 26, wherein the first group and the second group of inorganic particles comprise at least 99% boehmite by weight.

28. The electrochemical cell of claim 27, wherein the first group and the second group of inorganic particles comprise only boehmite.

29. The flexible porous composite battery separator of claim 17, wherein the first group and the second group of inorganic particles comprise at least 99% boehmite by weight.

30. The flexible porous composite battery separator of claim 29, wherein the first group and the second group of inorganic particles comprise only boehmite.

31. The flexible porous composite battery separator of claim 1, wherein greater than 90% of a pore volume of the flexible porous composite battery separator comprises pores having a pore diameter of less than 100 nm.

32. The electrochemical cell of claim 18, wherein greater than 90% of a pore volume of the flexible porous composite battery separator comprises pores having a pore diameter of less than 100 nm.

33. The flexible porous composite battery separator of claim 1, wherein a tensile stress of the flexible porous composite battery separator is 1500 psi or greater at 2% extension.

34. The flexible porous composite battery separator of claim 1, wherein a tensile stress of the flexible porous composite battery separator is 1000 psi or greater at 0.5% extension.

35. The electrochemical cell of claim 18, wherein a tensile stress of the flexible porous composite battery separator is 1500 psi or greater at 2% extension.

36. The electrochemical cell of claim 18, wherein a tensile stress of the flexible porous composite battery separator is 1000 psi or greater at 0.5% extension.

37. The electrochemical cell of claim 18, wherein the boehmite particles having the first particle size are grouped around a first mode and the boehmite particles having the second particle size are grouped around a second mode that differs from the first mode.

38. The electrochemical cell of claim 37, wherein the first mode is between 100-200 nm.

39. The electrochemical cell of claim 18, wherein the flexible porous composite battery separator has an average pore size of between 10-50 nm.

40. The electrochemical cell of claim 18, wherein the flexible porous composite battery separator has a porosity of between 35-50%.

41. The electrochemical cell of claim 25, wherein the polymeric binder comprises high molecular weight grade PVdF and/or copolymers thereof.

42. The electrochemical cell of claim 18, wherein the polymeric binder comprises a polymer selected from the group consisting of polyvinyl ethers, urethanes, acrylics, cellulosics, styrene-butadiene copolymers, natural rubbers, chitosan, nitrile rubbers, silicone elastomers, PEO or PEO copolymers, and polyphosphazenes.

43. The electrochemical cell of claim 18, wherein the polymeric binder further comprises a co-monomer.

44. The electrochemical cell of claim 18, wherein a dimensional stability of the flexible porous composite battery separator is substantially constant at temperatures from 50° C. to 250° C.

* * * * *